US011981177B1

(12) United States Patent
Cox

(10) Patent No.: US 11,981,177 B1
(45) Date of Patent: May 14, 2024

(54) DYNAMIC ANTI-ROLL BAR LINK

(71) Applicant: CHRISTOPHER COX CREATIVE, Park City, UT (US)

(72) Inventor: Christopher Paul Cox, Park City, UT (US)

(73) Assignee: Christopher Cox Creative, Park City, UT (US)

( * ) Notice: Subject to any disclaimer, the term of this patent is extended or adjusted under 35 U.S.C. 154(b) by 0 days.

(21) Appl. No.: 18/088,512

(22) Filed: Dec. 23, 2022

(51) Int. Cl.
*B60G 21/02* (2006.01)
*B60G 21/055* (2006.01)

(52) U.S. Cl.
CPC ....... *B60G 21/0556* (2013.01); *B60G 21/026* (2013.01); *B60G 2204/1224* (2013.01); *B60G 2800/012* (2013.01)

(58) Field of Classification Search
CPC .............. B60G 21/026; B60G 21/0556; B60G 2204/1224; B60G 2800/012; B60G 21/0553; B60G 21/0558; B60G 2204/122; B60G 21/073; B60G 2204/45; B60G 2204/46; B60G 2204/61; B60G 2206/427; B60G 2400/98
See application file for complete search history.

(56) References Cited

U.S. PATENT DOCUMENTS 4,664,408 A * 5/1987 Saotome .............. B60G 17/033
280/124.106
6,659,475 B2 * 12/2003 Clements ........... B60G 21/0556
267/188
7,029,014 B2 * 4/2006 Hamm ............... B60G 21/0556
280/5.509
2007/0045978 A1 * 3/2007 Beck .................. B60G 21/0556
280/124.101
2021/0283975 A1 * 9/2021 Cox .................... B60G 21/0556

FOREIGN PATENT DOCUMENTS

FR        3046570 A1 * 7/2017
JP     2002264625 A  * 9/2002 ......... B60G 21/0556

* cited by examiner

*Primary Examiner* — Jason D Shanske
*Assistant Examiner* — Daniel M. Keck
(74) *Attorney, Agent, or Firm* — Christensen O'Connor Johnson Kindness PLLC

(57) ABSTRACT

A dynamic anti-roll bar link for a vehicle suspension is provided. The link selectively transfers movement of the suspension system to the anti-roll bar, depending on a locked or unlocked state of the link. The anti-roll bar link includes an elongate link rod; a sliding assembly configured to translate axially along the elongate link; and a latch assembly configured to extend between the second retention member and the sliding assembly. In a locked state, the pawl portion can receive the pawl engaging member, and the retention member interface portion abuts the second retention member to prevent axial translation of the sliding assembly along the elongate link rod. In an unlocked state, the sliding assembly is permitted to translate axially along the elongate link rod. The primary and secondary latch bodies are pinned together in an over-center configuration in the locked state to prevent inadvertent unlocking.

23 Claims, 11 Drawing Sheets

DYNAMIC ANTI-ROLL BAR LINK

BACKGROUND

An anti-roll bar (or anti-sway bar) is a common component in automotive suspensions to help reduce the body roll of a vehicle during cornering and other dynamic events causing suspension articulation. In general, an anti-roll bar is connected between the suspension assemblies of the left and right side of a vehicle to transfer an amount of articulation between the sides. In some configurations, both front and rear anti-roll bars are used on a four-wheel vehicle. The anti-roll bar provides compensation to the suspension on one side of the vehicle when the suspension on the other opposing side is articulated, e.g. compressing the left rear wheel suspension when the right rear wheel suspension is compressed through vehicle cornering and/or traveling over road irregularities. In this regard, the anti-roll bar can work to compress or extend the suspension of the opposite side of the vehicle to maintain the left and right side at similar heights.

In such anti-roll bar configurations, when one side of the suspension articulates, the anti-roll bar system imparts a torsional force through the bar and links to the other side of the connected suspension components. FIG. 1 shows a conventional anti-roll bar configuration having a bar 1, a rigid link 2 connecting the bar 1 to an axle 3, and a spring 4 providing counter-resistance to input compression forces. For clarity, other common components of the suspension and vehicle systems have been omitted. In these conventional configurations, the links connecting the anti-roll bar to the suspension components are generally rigid, such that the torsional forces of the bar are directly transferred to the suspension components during articulation. In some road configurations, such as rough or broken pavement, anti-roll bars can produce jarring side-to-side body motions (a "waddling" sensation), which increase in severity with the diameter and stiffness of the anti-roll bar. Further, excessive role stiffness, which is typically a result of overly aggressive anti-roll bar setups, can cause the inside wheels to lift off the ground during hard cornering and other suspension articulation maneuvering.

Disconnecting the anti-roll bars may be desirable in certain situations where high-articulation of the suspension is beneficial, such as off-road or when traversing rugged terrain. When the anti-roll bars are disconnected, or otherwise modified to have a reduced effect, the suspension at each corner of the vehicle can articulate to a larger extent since the forces acting on the wheel in any given corner of the vehicle are imparted into only the suspension components in that corner. During off-road use, such increased articulation may improve the ability of the vehicle to traverse rugged terrain; however, vehicles can become unstable with the anti-roll bars disconnected, and are typically only usable at low vehicle speeds due to undamped side-to-side motion.

DESCRIPTION OF THE DRAWINGS

Many aspects of the present technology can be better understood with reference to the following drawings. The components in the drawings are not necessarily drawn to scale. Instead, emphasis is placed on illustrating clearly the principles of the present technology. Furthermore, components can be shown as transparent in certain views for clarity of illustration only and not to indicate that the component is necessarily transparent. Components may also be shown schematically.

DETAILED DESCRIPTION

Figure 1:
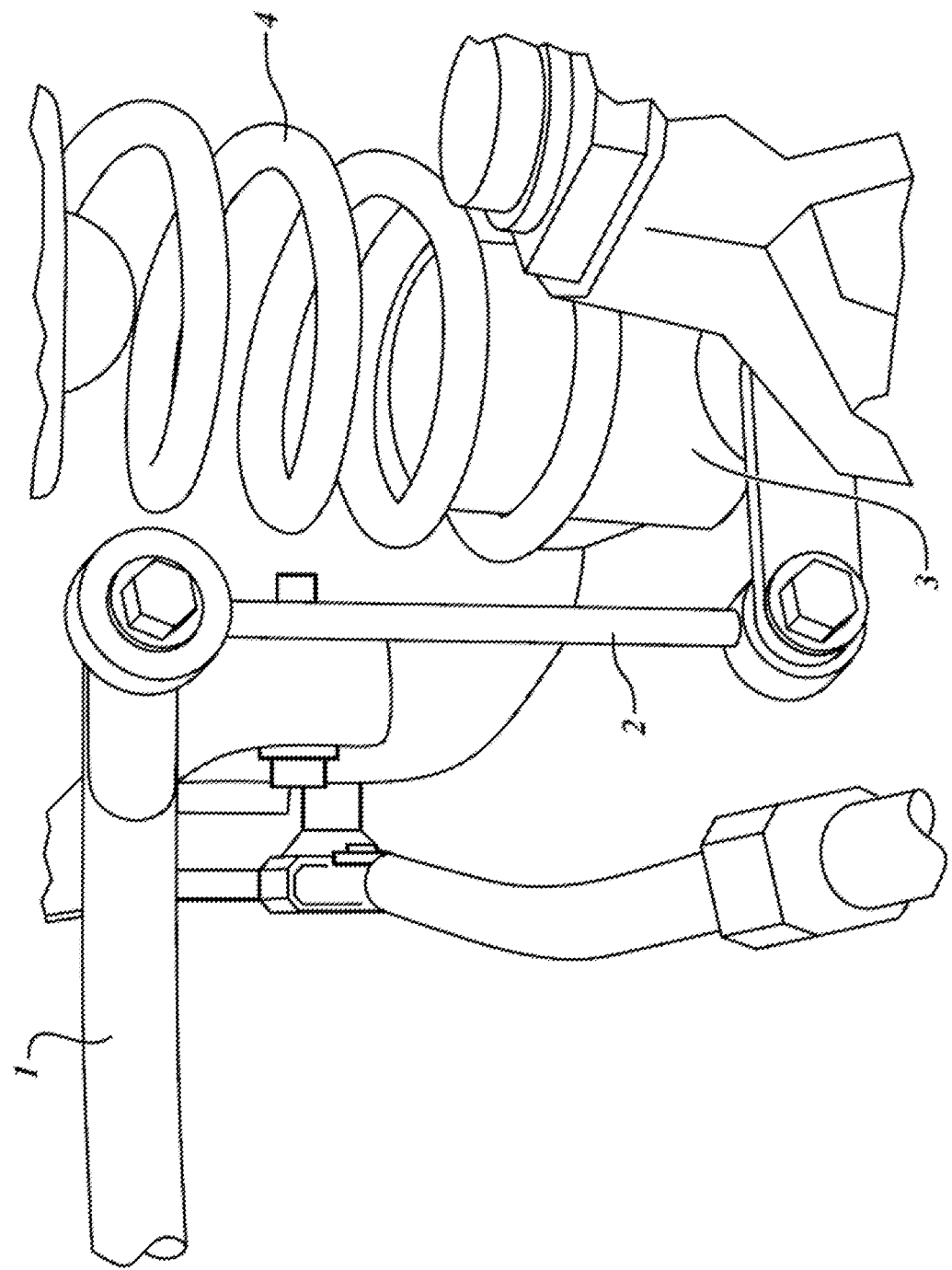
FIG. 1 is an environmental view of an anti-roll bar system configured in accordance with existing technology.

The following description provides several examples that relate to anti-roll bar configurations used in automotive suspensions. The embodiments of the dynamic anti-roll bar link described herein generally include features to provide selective relative motion between the anti-roll bar and the vehicle suspension. Unlocking the dynamic anti-roll bar links can provide the aforementioned advantages of a substantially disconnected anti-roll bar, by increased articulation of the suspension during off-road and other uses. In some embodiments, the anti-roll bar link of the present technology is configured for use with original equipment anti-roll bars, such that a user can install and gain the advantages of the anti-roll bar links without replacing various other suspension or anti-roll bar system components. As will be explained in greater detail below, the anti-roll bar link includes adjustability in the mounting features to adapt the link to different vehicle suspension configurations.

Embodiments of the dynamic anti-roll bar link can include: (1) a locked state, where the dynamic anti-roll bar link is substantially rigid and does not allow relative movement between the anti-roll bar and the suspension components; and (2) an unlocked state, where the dynamic anti-roll bar link is configured such that an anti-roll bar sliding assembly allows relative movement between the anti-roll bar and the suspension components. In the illustrated embodiments described herein, the dynamic anti-roll bar link is shown with the locked state corresponding to a position of the anti-roll bar sliding assembly translated to one end of a link assembly (e.g., as shown in FIGS. 2A-2C, which will be described below) and configured to receive a locking latch to place the dynamic anti-roll bar link in the locked state.

Certain details are set forth in the following description and in FIGS. 1-4B to provide a thorough understanding of various embodiments of the present disclosure. In other instances, well-known structures, systems, materials and/or operations often associated with anti-roll bar systems, link assemblies, and associated components are not shown or described in detail in the following disclosure to avoid unnecessarily obscuring the description of the various embodiments of the disclosure. Those of ordinary skill in the art will recognize, however, that embodiments of the present disclosure can be practiced without one or more of the details set forth herein, or with other structures, methods, components, and so forth. The terminology used below is to be interpreted in its broadest reasonable manner, even though it is being used in conjunction with a detailed description of certain examples of embodiments of the present disclosure. Indeed, certain terms may even be emphasized below; however, any terminology intended to be interpreted in any restricted manner will be overtly and specifically defined as such in this Detailed Description section.

The accompanying Figures depict embodiments of the present disclosure and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present disclosure. Those of ordinary skill in the art will also appreciate that further embodiments of the invention can be practiced without several of the details described below. In the Figures, identical reference numbers identify identical, or at least generally similar, elements.

Figure 2A:
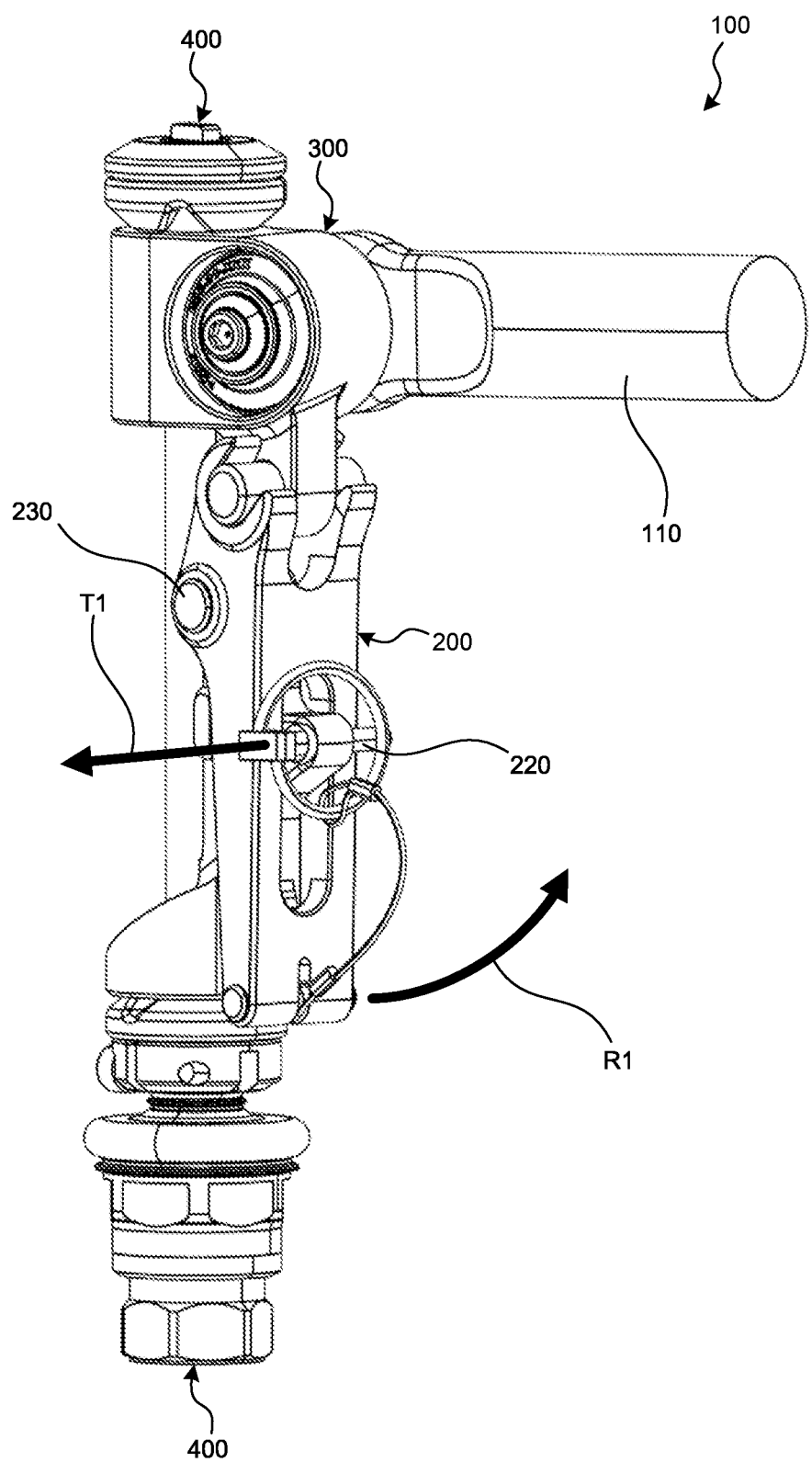
FIG. 2A is a side perspective view of a dynamic anti-roll bar link assembly configured in accordance with embodiments of the present disclosure, showing the dynamic anti-roll bar link assembly in a locked state.
Figure 2B:
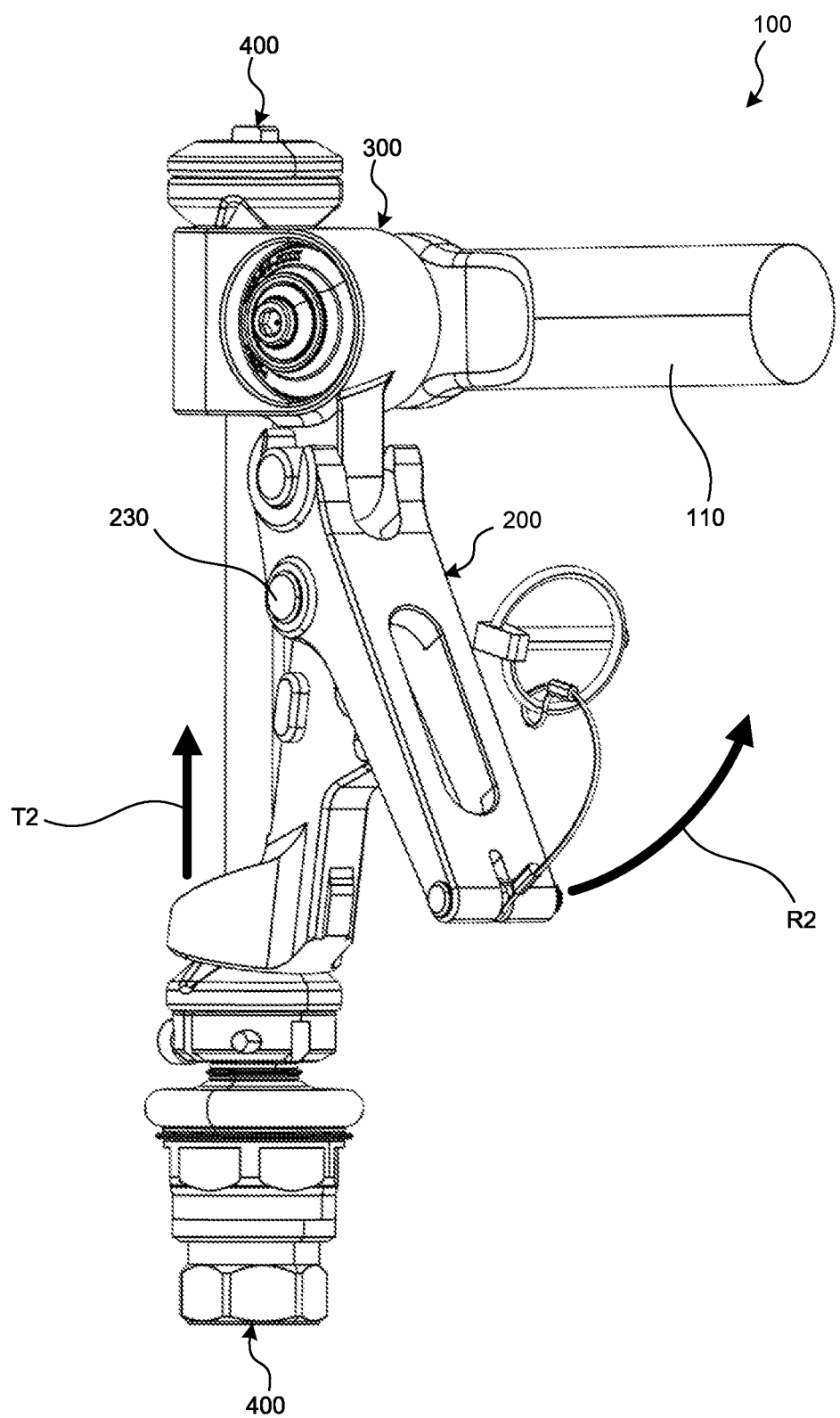
FIG. 2B is a side perspective view of the dynamic anti-roll bar link assembly of FIG. 2A, showing the dynamic anti-roll bar link assembly in an intermediate state transitioning away from the locked state.
Figure 2C:
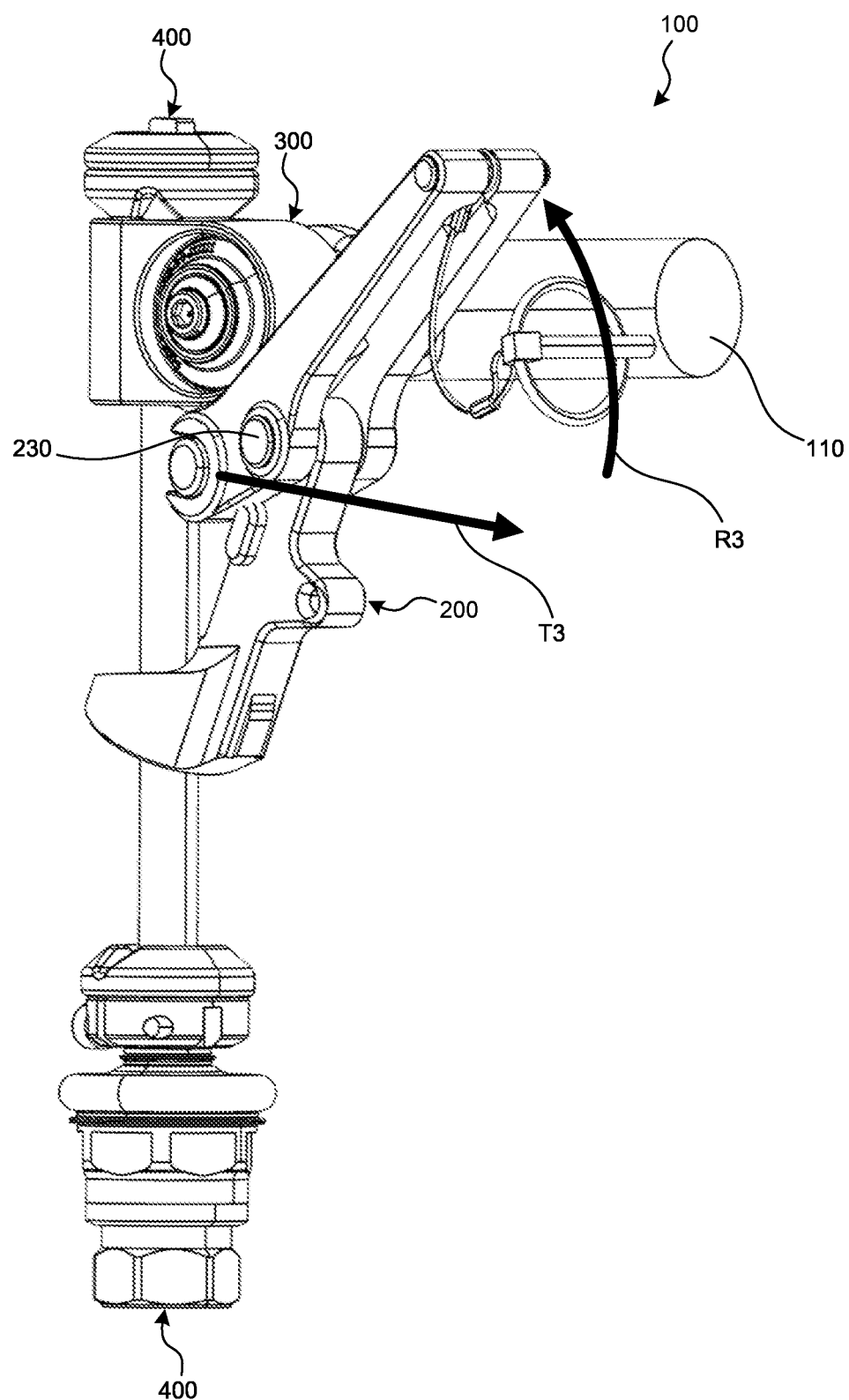
FIG. 2C is a side perspective view of the dynamic anti-roll bar link assembly of FIG. 2A, showing the dynamic anti-roll bar link assembly with a locking latch in position for removal.

FIGS. 2A-2C are side perspective views of a dynamic anti-roll bar link assembly 100 ("assembly 100") configured in accordance with embodiments of the present disclosure, showing the assembly 100 in a locked state (FIG. 2A), in an intermediate state transitioning away from the locked state (FIG. 2B), and with a locking latch assembly 200 in position for removal (FIG. 2C). The assembly 100 is shown in FIGS. 2A-2C in one orientation with an anti-roll bar portion 110 near an upper end of the assembly 100; however, in other embodiments, the assembly 100 can be configured for use in the opposite orientation, with the anti-roll bar portion 110 nearer the lower end of the assembly 100. The configuration of the assembly 100 can be selected based on the configuration of the suspension system (e.g., for user access to the locking latch assembly 200, suspension geometry, damage protection, corrosion, etc.). In the Figures, the full anti-roll bar is omitted for clarity, and only a portion of which (the anti-roll bar portion 110) being shown for discussion purposes.

The assembly 100 includes the locking latch assembly 200 ("latch assembly 200," see FIG. 2D, described below), an anti-roll bar sliding assembly 300 ("sliding assembly 300," see FIG. 3D, described below), and a link assembly 400 (see FIGS. 4A and 4B, described below). As shown, embodiments of the assembly 100 include the sliding assembly 300 being slidingly associated with the link assembly 400 to allow movement of the anti-roll bar with respect to the suspension of the vehicle. In this regard, unlocking the assembly (e.g., by removing the latch assembly 200, as shown in FIGS. 3A-3C) allows the sliding assembly 300 to translate with respect to the link assembly 400 which reduces the effect of the anti-roll bar on the vehicle suspension. To an extent, the unlocked state of the assembly 100 is at least similar to disconnecting the anti-roll bar, which may be desirable in certain situations where high-articulation of the suspension is beneficial, such as off-road or when traversing rugged terrain. When the anti-roll bars are disconnected, the suspension at each corner of the vehicle can articulate to a larger extent since the forces acting on the wheel in any given corner of the vehicle are imparted into only the suspension components in that corner.

Transitioning the assembly 100 from the locked state to the unlocked state will now be described in greater detail. Starting with FIG. 2A, the assembly 100 is shown in the locked state with the latch assembly 200 extending between an end of the link assembly 400 and the sliding assembly 300 at an opposite end, locking the sliding assembly 300 against the opposite end. In some embodiments, the latch assembly can include a locking pin 220 that prevents inadvertent unlocking of the latch assembly 200. In embodiments with the locking pin 220, the locking pin 220 can be first removed by translating the locking pin 220 in a direction T1, which removes the pin 220 from interfering with the movement of the latch assembly 200. The latch assembly 200 can then rotate in a direction R1 about a pivot pin 230. Turning next to FIG. 2B, the latch assembly 200 is further rotated in a direction R2 about the pivot pin 230 such an end of the latch assembly 200 translates in a direction T2 toward the sliding assembly 300 along the link assembly 400. Lastly, in FIG. 2C, the latch assembly 200 is fully rotated in a direction R3 about the pivot pin 230 such that latch assembly 200 can be translated in a direction T3 to remove the latch assembly 200 from the assembly 100, leaving the sliding assembly 300 and the link assembly 400.

Figure 2D:
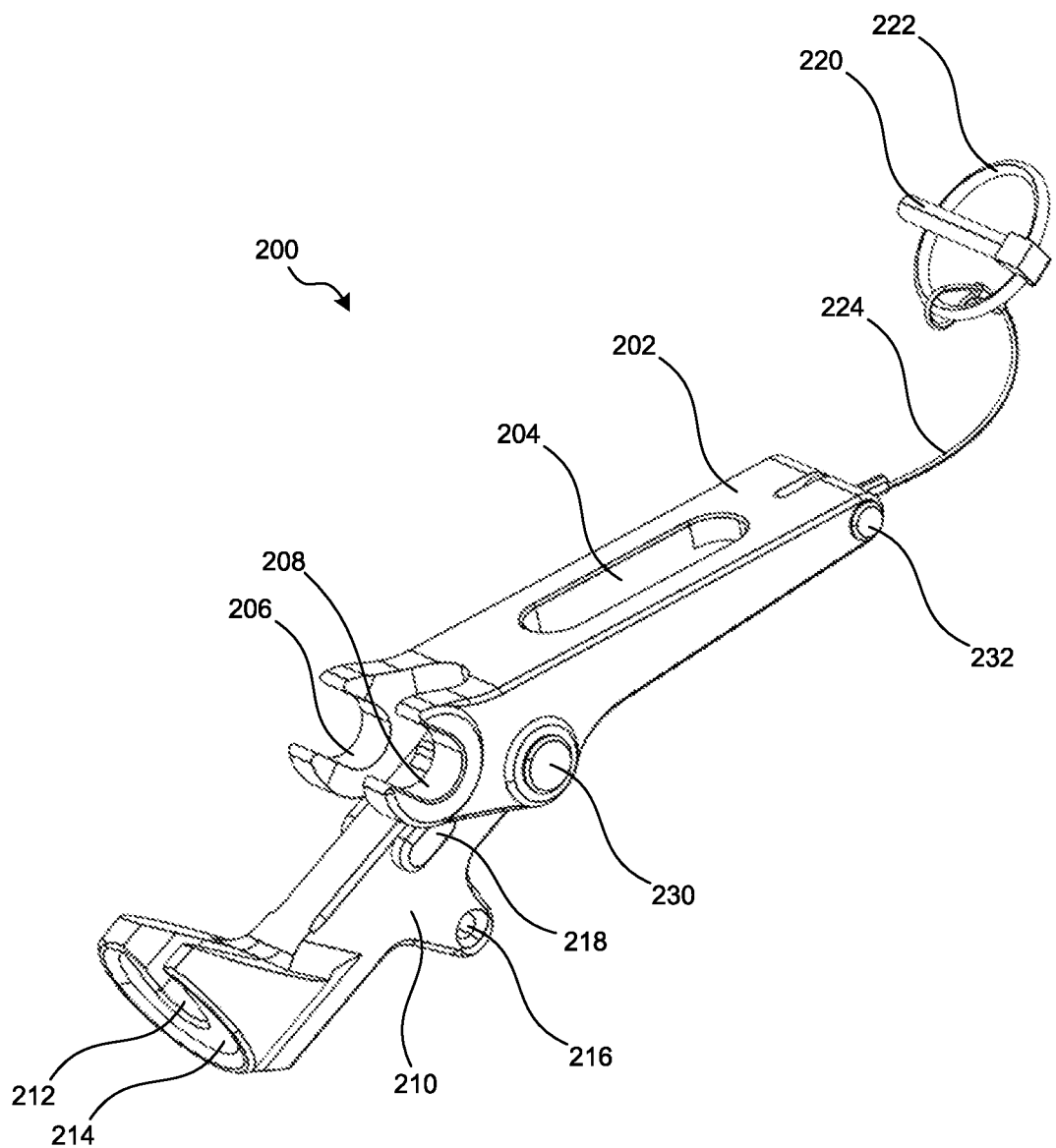
FIG. 2D is a perspective view of a locking latch of the dynamic anti-roll bar link assembly of FIG. 2A.
Figure 3A:
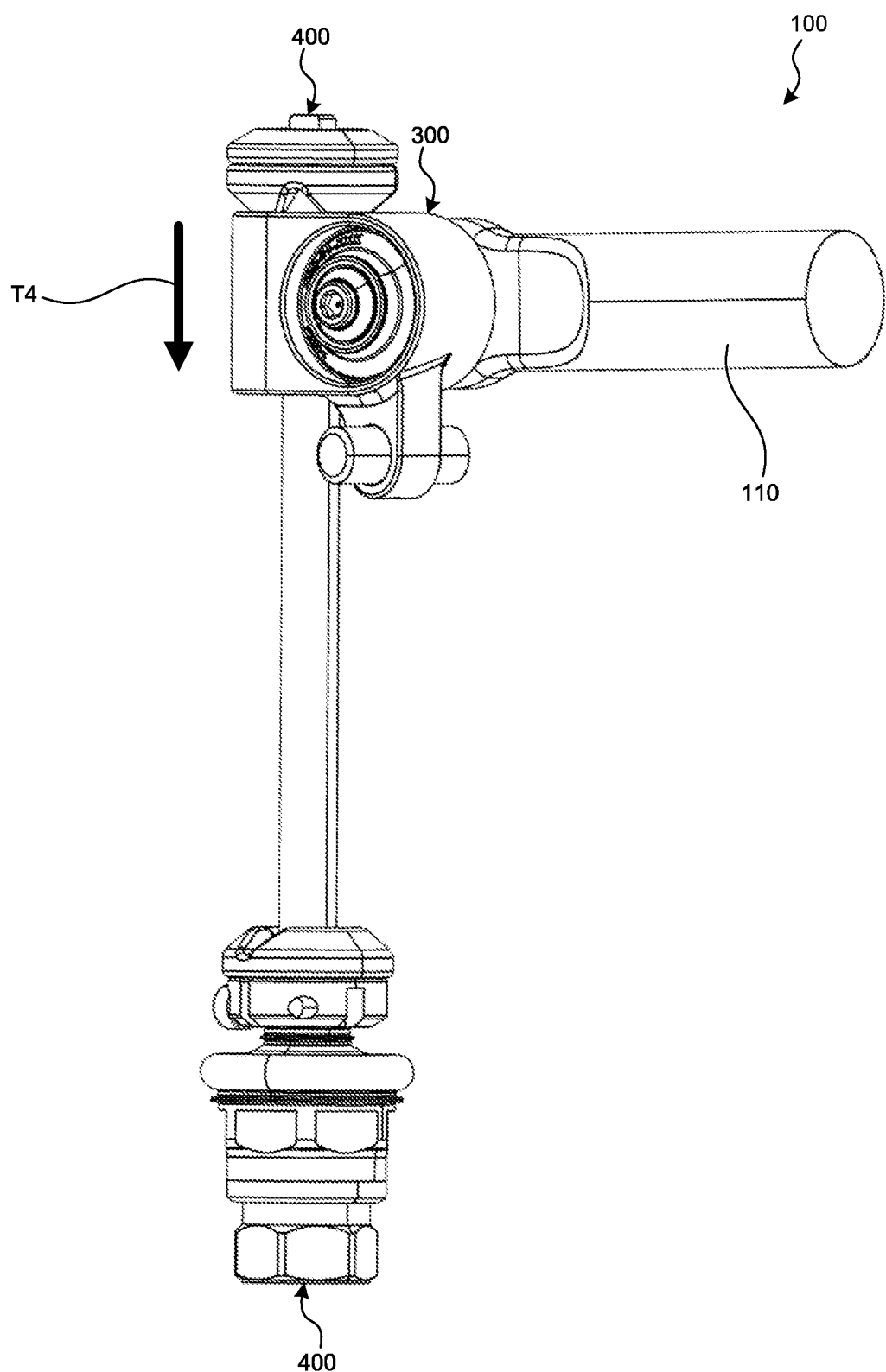
FIG. 3A is a side perspective view of the dynamic anti-roll bar link assembly of FIG. 2A, showing the dynamic anti-roll bar link assembly in an unlocked state with an anti-roll bar sliding assembly in a first position.
Figure 3B:
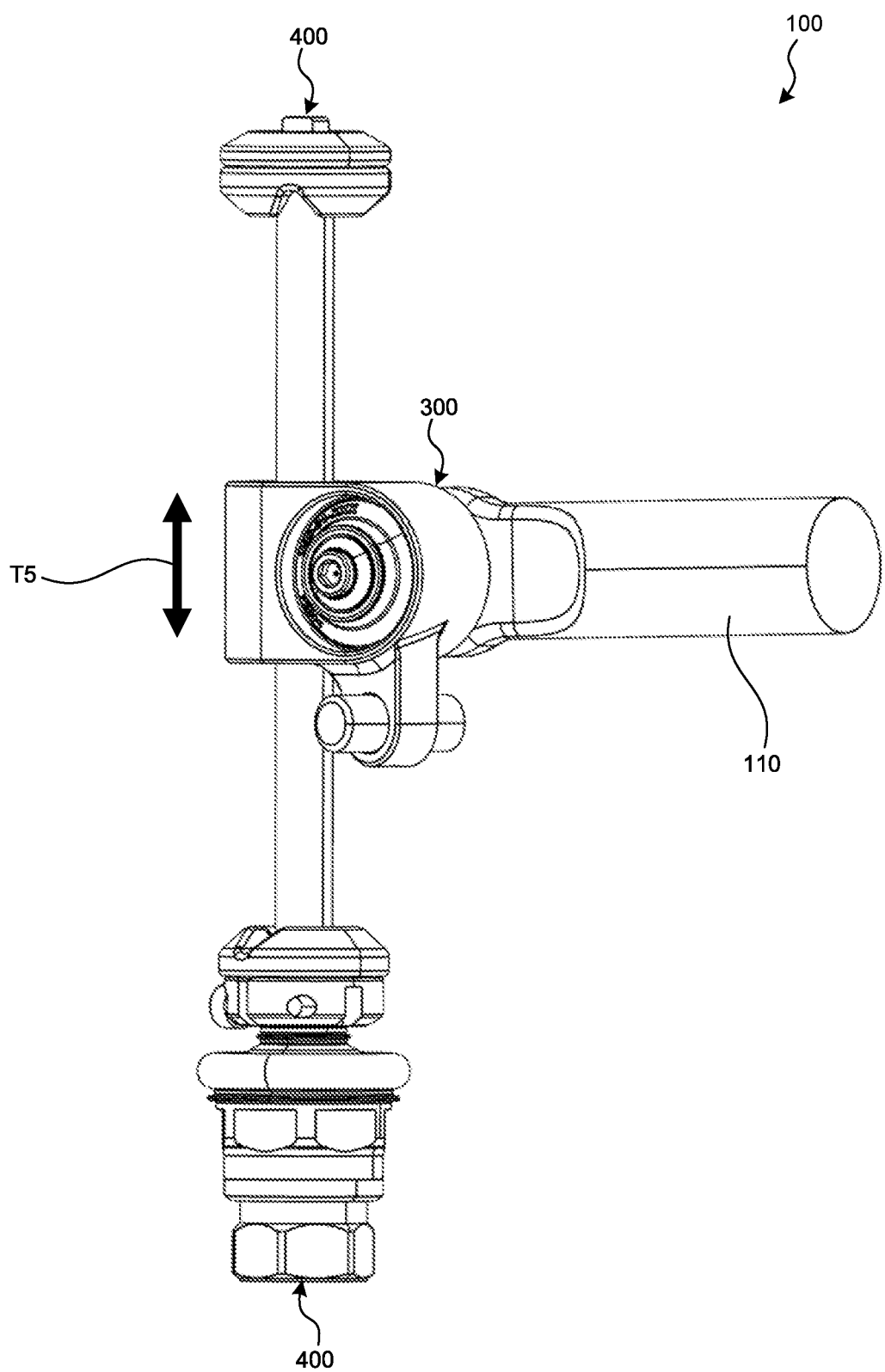
FIG. 3B is a side perspective view of the dynamic anti-roll bar link assembly of FIG. 2A, showing the dynamic anti-roll bar link assembly in the unlocked state with the anti-roll bar sliding assembly in a second position.
Figure 3C:
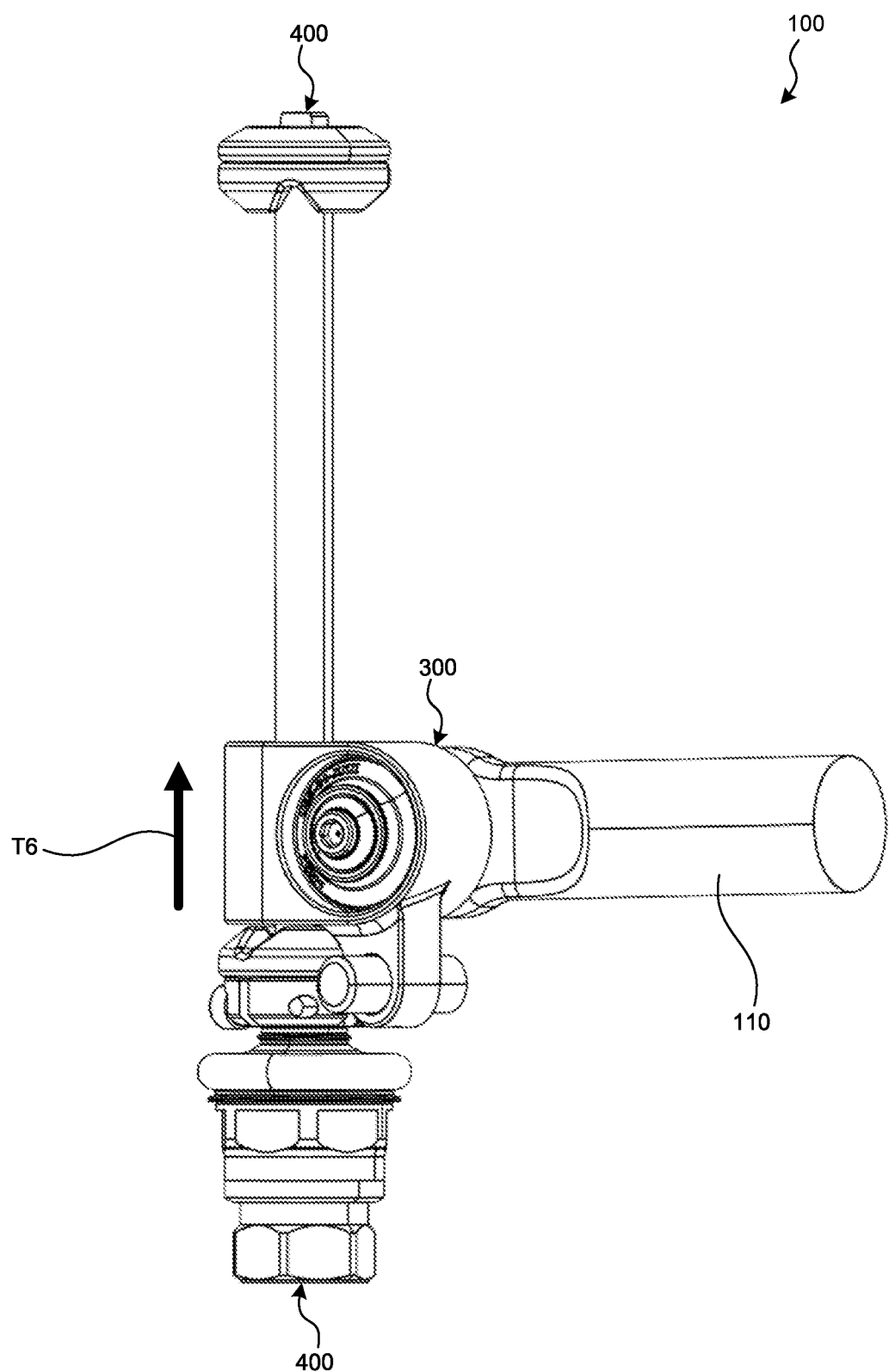
FIG. 3C is a side perspective view of the dynamic anti-roll bar link assembly of FIG. 2A, showing the dynamic anti-roll bar link assembly in the unlocked state with the anti-roll bar sliding assembly in a third position.

FIG. 2D is a perspective view of the latch assembly 200 of the assembly 100. The latch assembly 200 can have an "over-center" configuration such that the components of the latch assembly 200 maintain the latch assembly 200 in the locked state (FIG. 2A) and resist inadvertent movement toward the unlocked state until the components of the latch assembly 200 are rotated to overcome the over-center configuration (e.g., at least partially rotated in the direction R1 toward the position shown in FIG. 2B). In some embodiments, the latch assembly 200 can include a primary latch body 202 having a locking slot 204, a first pawl portion 206, and a second pawl portion 208. The first and second pawl portions 206 and 208 can be configured to receive a pin of the sliding assembly 300 (e.g., a pin 340, see FIG. 3D) to articulate the sliding assembly 300 into the locked state.

The latch assembly 200 can further include a secondary latch body 210 rotatably pinned to the primary latch body 202 with the pivot pin 230. The secondary latch body 210 can include a rod pawl portion 212, a retention member interface portion 214, a locking aperture 216, and a stop protrusion 218. The rod pawl portion 212 can be configured to partially surround a link rod of the link assembly 400 (e.g., a link rod 402, see FIGS. 4A and 4B) such that the secondary latch body 210 translates along the link rod during movement between the locked and unlocked states. In the locked state of FIG. 2A, the retention member interface portion 214 can be configured to abut a bumper component of the link assembly 400 (e.g., a second bumper 420, see FIGS. 4A and 4B) which provides a biasing force toward the pivot pin 230 to keep the latch assembly 200 in the locked state as a result of the over-center configuration. As will be explained in greater detail below, first and second bumpers 410 and 420 of the link assembly 400 can provide compliance to the anti-roll bar system to reduce noise, vibration, and harshness (NVH) between the anti-roll bar and the assembly 100, and to allow thermal expansion/contraction of the components.

When the latch assembly 200 is in the locked state as shown in FIG. 2A, the locking aperture 216 extends through the locking slot 204 to a position to receive the locking pin 220. In some embodiments, the locking pin 220 can include a loop portion 222 rotatably coupled to the locking pin 220 which can provide leverage during removal of the locking pin 220 (e.g., by inserting a finger through the loop portion 222 to remove the locking pin 220). The latch assembly 200 can further include a lanyard wire 224 operably coupling the locking pin 220 and the loop portion 222 to the primary latch body 202 with a connecting pin 232 extending therethrough. In use, the lanyard wire 224 can prevent loss of the locking pin 220 and the loop portion 222 upon removal from the locking aperture 216.

Turning now to FIGS. 3A-3C, there is shown side perspective views of the assembly 100 in an unlocked state with the sliding assembly 300 in a first position relative to the link assembly 400 (FIG. 3A), in a second position relative to the link assembly 400 (FIG. 3B), and in a third position relative to the link assembly 400 (FIG. 3C). After the latch assembly 200 is rotated to the unlocked state and removed from the assembly 100, the sliding assembly 300 is configured to slide along the link rod 402 to reduce the effect of the anti-roll bar on the vehicle suspension and allow greater articulation. In the position shown in FIG. 3A, the sliding assembly 300 can translate along the link rod 402 in a direction T4, in the position shown in FIG. 3B, the sliding assembly 300 can translate along the link rod 402 in the directions T5, and in the position shown in FIG. 3C, the sliding assembly 300 can translate along the link rod 402 in the direction T6. Each of these Figures are intended to shown examples of the position of the sliding assembly 300 with respect to the link assembly 400; however, any position of the sliding assembly 300 with respect to the link assembly 400 is within the scope of the present disclosure. In use, the assembly 100 can allow articulation across the vehicle of about double the travel of each of the sliding assemblies 300 (e.g., one on each of the front suspension corners, one on each of the rear suspension corners). In a high articulation event, the anti-roll bar can be at the upper end of the assembly 100 on one side of the vehicle (e.g., the position shown in FIG. 3A), and at the lower end of the assembly 100 on the other side of the vehicle (e.g., the position shown in FIG. 3C) for full articulation of the suspension system of the vehicle. In this maximized travel state, further articulation of the suspension system would flex the anti-roll bar.

Figure 3D:
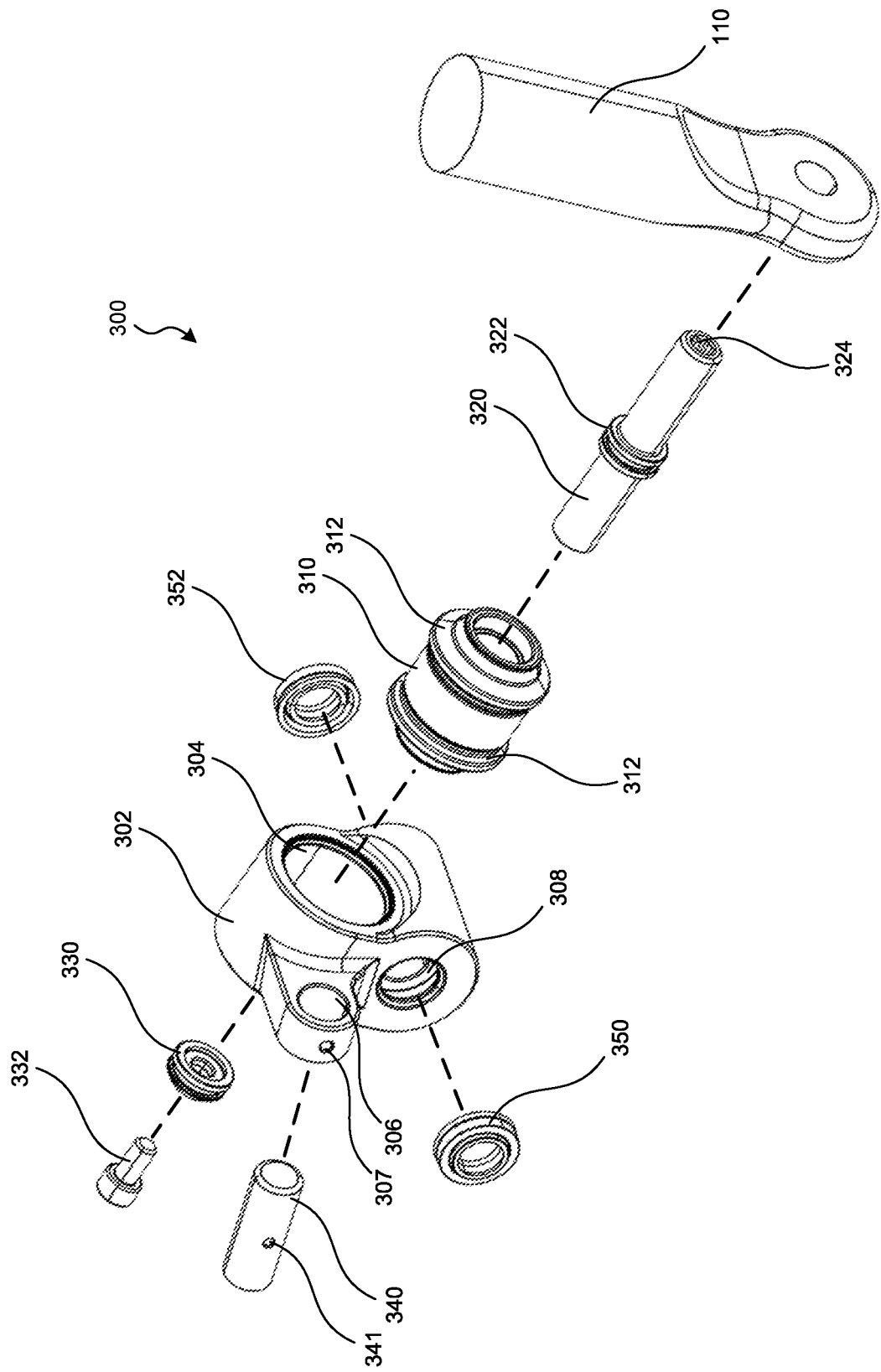
FIG. 3D is a exploded perspective view of the anti-roll bar sliding assembly of FIGS. 3A-3C.

The sliding assembly 300 will now be described with reference to FIG. 3D. The sliding assembly 300 can include a sliding body 302 having a primary bore 304, a secondary bore 306, and a tertiary bore 308. The primary bore 304 can be configured to receive an anti-roll bar mounting bushing 310 having a pair of opposing lip portions 312 to retain the anti-roll bar mount bushing 310 within the primary bore 304 to prevent axial movement during articulation of the suspension system. The anti-roll bar mounting bushing 310 can be configured to receive a mounting rod 320 therein. The mounting rod 320 can include a grease seal 322 to retain grease within the anti-roll bar mounting bushing 310 when the mounting rod 320 is partially inserted therein. On the opposite side of the anti-roll bar mounting bushing 310, an opposing grease seal 330 can be coupled to the anti-roll bar mounting bushing 310 with a fastener 332 that can threadingly interface with the mounting rod 320 to retain the mounting rod 320 within the anti-roll bar mounting bushing 310. The mounting rod 320 can include a feature 324 (e.g., a hex socket 324) to aid in holding the rotational position of the mounting rod 320 as the fastener 332 is torqued. In some embodiments, once assembled the mounting rod 320 can articulate with respect to the anti-roll bar mounting bushing 310 in any suitable direction (e.g., axially, radially, skewed, etc.). In other embodiments, any or all of the suitable directions of articulation of the mounting rod 320 can be fixed. Although not shown, the anti-roll bar portion 110 can operably couple to the mounting rod 320 using any suitable coupling (e.g., a nut threaded onto the mounting rod 320, etc.)

The secondary bore 306 of the sliding body 302 can be configured to receive the pin 340 (e.g., a pawl engaging member 340) that is configured to be received within the first and second pawl portions 206 and 208 to articulate the sliding assembly 300 into the locked state. The pin 340 can be pinned within the secondary bore 306 with a set screw or other pin member (e.g., a roll pin, not shown) extending through a first pin locking aperture 307 and into a second pin locking aperture 341 in the pin 340, or the second pin locking aperture 341 can be omitted such that a set screw can bear against the pin 340 to lock the axial and radial position of the pin 340 with respect to the sliding body 302. In other embodiments, any suitable pawl engaging member can interface with the first and second pawl portions 206 and 208, such as a protrusion, a bore, etc.

The tertiary bore 308 of the sliding body 302 can be configured to receive the link rod 402 therethrough such that the sliding assembly 300 is permitted to slide along the link rod 402 during articulation of the suspension system of the vehicle. As shown, the tertiary bore 308 can be further configured to receive first and second slide bearings/bushings 350 and 352 which interface the link rod 402 and reduce friction and wear thereon during relative movement of the sliding assembly 300 and the link assembly 400. The tertiary bore 308 can be configured to retain grease therein, with such grease being retained within the tertiary bore 308 by the first and second slide bearings/bushings 350 and 352.

Figure 4A:
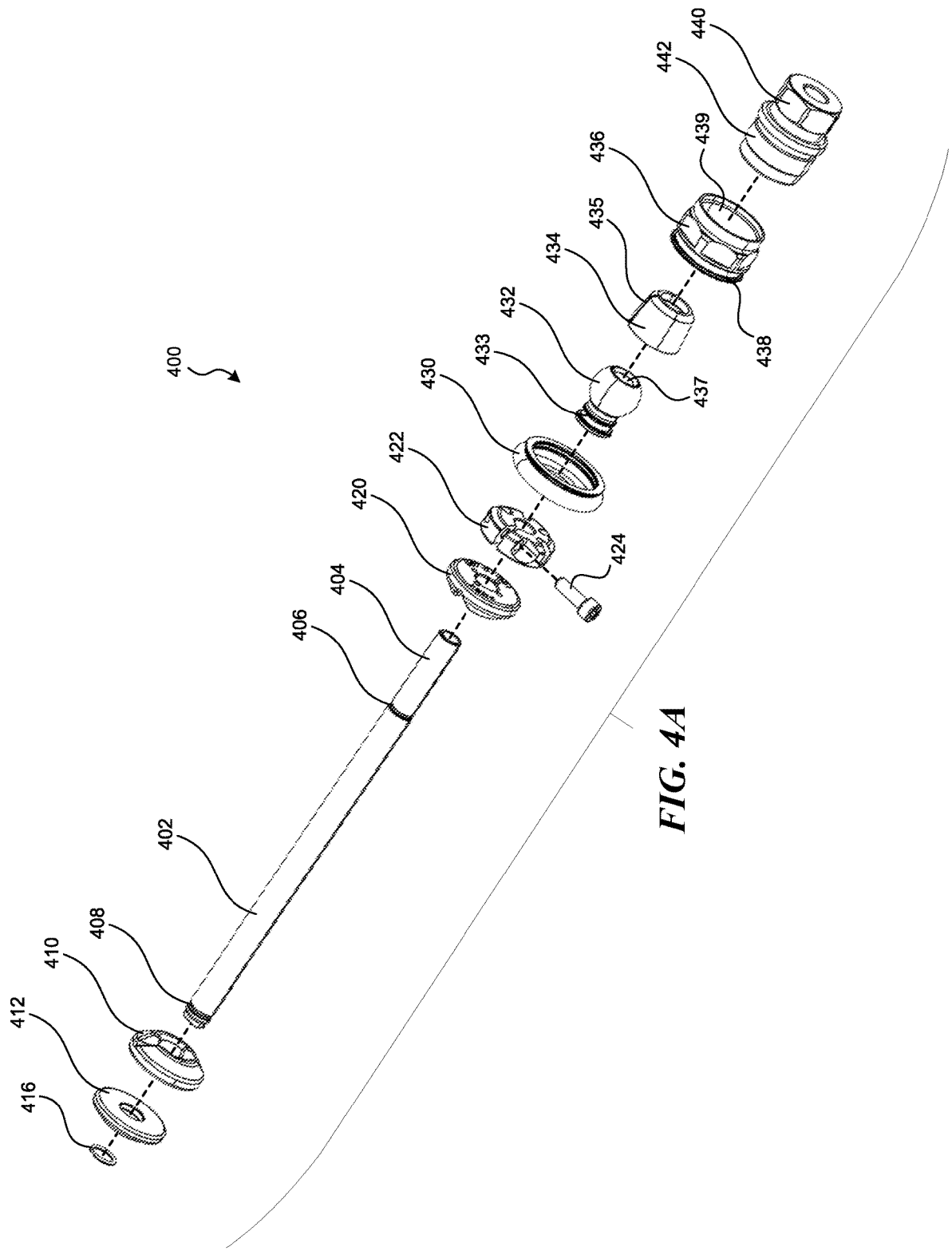
FIGS. 4A and 4B are exploded perspective views of a link assembly of the dynamic anti-roll bar link assembly of FIG. 2A.
Figure 4B:
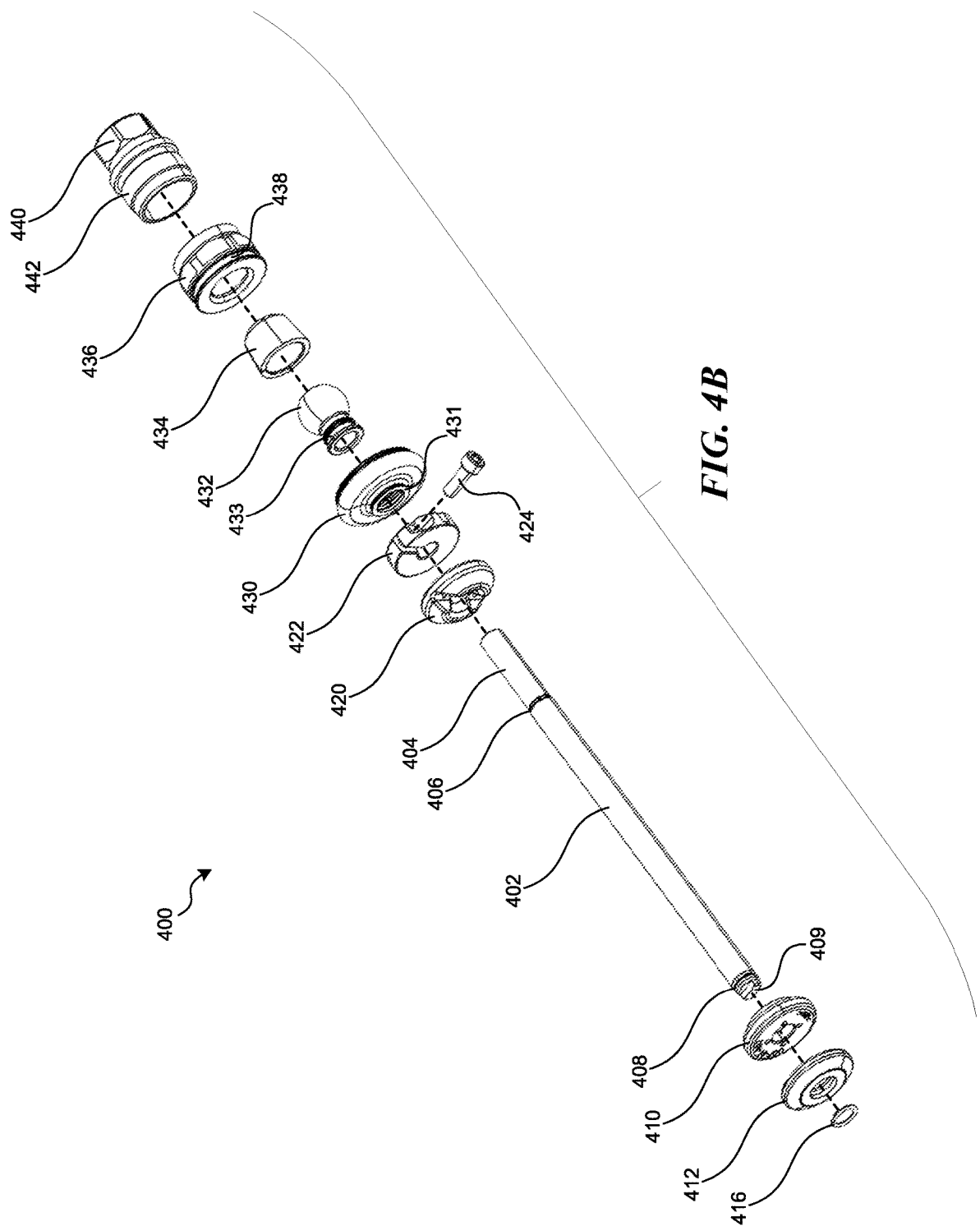

Turning to FIGS. 4A and 4B, there is shown exploded perspective views of the link assembly 400 of the assembly 100. The link assembly 400 can include the link rod 402 having a shoulder portion 404 and a stopping step 406 therebetween. The link rod 402 can also include a groove 408 configured to receive a snap ring to limit axial movement of components along the link rod 402 as the sliding assembly 300 travels axially and/or when the latch assembly 200 is locked on the assembly 100. During assembly, the link rod 402 can extend through the first bumper 410 and through an end seat 412 (e.g., a first retention member 412), with each of these components being retained on the link rod 402 by a snap ring 416 positioned within the groove 408. In the illustrated configuration, the first bumper 410 and the end seat 412 can translate axially along the link rod 402 toward the shoulder portion 404, but the snap ring 416 can be configured to prevent axial translation of the first bumper 410 and the end seat 412 off of the end of the link rod 402 having the groove 408. The first and second bumpers 410 and 420 can be configured to limit the axial travel of the sliding assembly 300. The axial travel of the sliding assembly 300 can be further limited by altering the position of the first and second bumpers 410 and 420 along the link rod 402, by changing the thickness of the end stop 412 and/or a lock ring 422, etc.

The opposite end of the link rod 402 from the groove 408 is configured to extend through the second bumper 420 and through the ring lock 422 that is axially and rotatably lockable with respect to the link rod 402 by a fastener 424. The ring lock 422 (e.g., a second retention member 422) can be configured to prevent axial movement of the sliding assembly 300 past the stopping step 406 as the sliding assembly 300 travels axially and/or when the latch assembly 200 is locked on the assembly 100. In other embodiments, the any suitable retention member can be positioned and configured to prevent axial movement of the sliding assembly 300 past the stopping step 406, e.g., an end seat with a snap ring, a nut, a clamp, etc. The first and second bumpers 410 and 420 can be formed from any suitable material, such as rubber, plastic, microcellular foam, among other materials.

The ring lock 422 can be threadable onto the shoulder portion 404 and thereby adjustable in axial position along the link rod 402 to adjust for, e.g., wear on the first and second bumpers 410 and 420, differences in span of mounting distances between vehicle suspension components, wear of components on the vehicle suspension system, etc. The link rod 402 may additionally have different lengths for different configuration of vehicle suspension (e.g., spanning longer or shorter distances between the mounting point on the suspension and the position of the anti-roll bar end). In other embodiments, the mounting distance between the mounting point on the suspension and the anti-roll bar end can be adjusted with shims (not shown) positioned between the first bumper 410 and the end seat 412 and/or positioned between the second bumper 420 and the ring lock 422. Other shimming configurations are also within the scope of the present disclosure.

A portion of the link assembly 400 can be articulable by a ball joint assembly as will now be described in detail. The link assembly 400 can further include a ball socket 432 that can be threadingly coupled to the shoulder portion 404 of the link rod 402 on the opposite side of the ring lock 422 from the second bumper 420. In some embodiments, torqueing of the ball socket 432 can be aided by inserting a tool into a feature 437 (e.g., a hex socket, see FIG. 4A) while clamping on a blade end 409 (see FIG. 4B) on the other end of the link rod 402. The ball socket 432 can include a circumferential groove 433 that is configured to receive a lip portion 431 of an articulating grease seal 430. In this configuration, the groove 433 can prevent axial movement of the lip portion 431 during articulation about the ball socket 432. To aid in articulation and reduce wear, the ball socket 432 can be surrounded with a friction-reducing sleeve 434 having a slit 435 for installation over the ball socket 432. The sleeve 434 can be formed from any suitable friction-reducing material, such as TEFLON®, plastic, etc. The sleeve 434 can be retained by an inner mounting nut 436 such that expansion of the sleeve 434 is prevented by a bore 439 of the inner mounting nut 436 to axially retain the inner mounting nut 436 on the ball socket 432 and the link bar 402. The inner mounting nut 436 can include a groove 438 or other suitable feature to sealingly couple with the articulating grease seal 430 to retain grease therein.

The link assembly 400 can further include an outer mounting nut 440 that is operably couplable to the inner mounting nut 436 (e.g., with threads 442 being threaded into threads within the bore 439). The inner and outer mounting nuts 436 and 440 can include features to aid in relative torque of these components (e.g., wrench flats, grooves, apertures, or other suitable features). In this regard, the assembly 100 can be installed onto the suspension system of the vehicle by removing the outer mounting nut 440, partially inserting the inner mounting nut 436 into a mounting hole on the suspension system of the vehicle, and threading the outer mounting nut 440 onto the inner mounting nut 436, thereby clamping the two mounting nuts on either side of the mounting bracket of the suspension system of the vehicle. As a result of the ball socket 432, the components of the inner and outer mounting nuts 436 and 440 and the sleeve 434 can articulate with respect to the remainder of the assembly 100. Such articulation can allow various mounting configurations of the assembly 100 while still maintaining relative motion of the suspension component with respect to the anti-roll bar (e.g., the portion 110) as the sliding assembly 300 travels through the range of motion along the link rod 402 between the first and second bumpers 410 and 420.

Although embodiments are shown for use with an automotive suspension system for purposes of the present disclosure, the dynamic anti-roll bar link assemblies described herein can be used with any suitable type of suspension system, e.g., heavy equipment suspension, tractor suspension, forklift suspension, etc. Accordingly, the various embodiments of the present technology described herein are not limited to use with a particular configuration.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., gas, air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. An anti-roll bar link for a vehicle suspension, the anti-roll bar link comprising:
    an elongate link rod having a first end configured to receive a first retention member, and a second end opposite the first end and configured to receive a second retention member;
    a sliding assembly configured to translate axially along at least a portion of the elongate link rod between the first and second retention members, the sliding assembly comprising:
        a body including a first bore and a second bore configured to receive the elongate link rod therethrough;
        a mounting rod extending through the first bore, the mounting rod configured to operably couple to an anti-roll bar; and
        a pawl engaging member operably coupled to the body; and
    a latch assembly configured to extend between the second retention member and the sliding assembly, the latch assembly comprising:
        a primary latch body having a pawl portion configured to receive the pawl engaging member therein; and
        a secondary latch body pinned to the primary latch body, the secondary latch body having a retention member interface portion,
    wherein, when the latch assembly is in a locked state, the pawl portion receives the pawl engaging member and the retention member interface portion interfaces with the second retention member to prevent axial translation of the sliding assembly along the elongate link rod, and
    wherein, when the latch assembly is in an unlocked state, the sliding assembly is permitted to translate axially along at least a portion of the elongate link rod between the first and second retention members.

2. The anti-roll bar link of claim 1, wherein the primary and secondary latch bodies are pinned together in an over-center configuration in the locked state.

3. The anti-roll bar link of claim 1, further comprising a first bumper positioned axially adjacent to the first retention member along the elongate link rod and facing the sliding assembly, and a second bumper positioned axially adjacent to the second retention member along the elongate link rod and facing the sliding assembly.

4. The anti-roll bar link of claim 3, wherein the first and second bumpers are formed from an elastomeric material to permit relative axial movement of the sliding assembly when the first and second bumpers are positioned between the sliding assembly and the respective first and second retention members.

5. The anti-roll bar link of claim 1, wherein the secondary latch body has a pawl portion configured to receive the elongate link rod therein in the locked state.

6. The anti-roll bar link of claim 1, wherein the latch assembly includes a locking aperture configured to receive a locking pin to prevent inadvertently transitioning the latch assembly from the locked state to the unlocked state.

7. The anti-roll bar link of claim 1, wherein the sliding assembly further comprises a mounting bushing positioned in the first bore and surrounding at least a portion of the mounting rod, wherein the mounting bushing is configured to permit articulation of the mounting rod with respect to the body.

8. The anti-roll bar link of claim 1, further comprising an inner mounting nut and an outer mounting nut positioned adjacent to the second retention member, wherein the inner mounting nut and the outer mounting nut are configured to couple the anti-roll bar link to the vehicle suspension.

9. The anti-roll bar link of claim 8, further comprising a ball socket operably coupled to the elongate link rod, and a sleeve at least partially surrounding the ball socket, wherein articulation of the inner and outer mounting nuts with respect to the elongate link rod causes the sleeve to slide relative to the ball socket.

10. The anti-roll bar link of claim 8, further comprising an articulating grease seal extending away from the elongate link rod to the inner mounting nut.

11. The anti-roll bar link of claim 1, wherein the second retention member is a lock ring, and wherein the lock ring position is axially adjustable with respect to the first retention member along the elongate link rod and configured to change the distance between the first and second retention members.

12. An anti-roll bar link for a vehicle suspension, the anti-roll bar link comprising:
   a link rod having a first end portion and a second end portion opposite the first end portion, wherein the first end portion includes an end seat and the second end portion includes a mounting nut configured to operably couple the anti-roll bar link to the vehicle suspension;
   a lock ring positioned inward from the mounting nut at the second end portion, the lock ring positionable along the link rod;
   a body operably couplable to an anti-roll bar and configured to translate axially along at least a portion of the link rod between the end seat and the lock ring; and
   a latch assembly configured to extend between the lock ring and the body, the latch assembly comprising:
      a primary latch body having a portion configured to interface with the body; and
      a secondary latch body pinned to the primary latch body and configured to interface with the lock ring,
   wherein, when the latch assembly is in a locked state, the primary latch body abuts the body and the secondary latch body interfaces with the lock ring to prevent axial translation of the body along the link rod,
   wherein, when the latch assembly is in an unlocked state, the body is permitted to translate axially along the link rod between the end seat and the lock ring to increase articulation of the anti-roll bar of the vehicle suspension.

13. The anti-roll bar link of claim 12, wherein the primary and secondary latch bodies are pinned together in an over-center configuration in the locked state.

14. The anti-roll bar link of claim 12, further comprising a first bumper positioned adjacent to and axially inward along the link rod from the end seat, and a second bumper positioned adjacent to and axially inward along the link rod from the lock ring.

15. The anti-roll bar link of claim 14, wherein the first and second bumpers are formed from an elastomeric material to permit relative movement of the body when the first and second bumpers are positioned between the body and the respective end seat and the lock ring.

16. The anti-roll bar link of claim 14, wherein the second end portion includes a stopping step configured to fix the axial position of the second bumper.

17. The anti-roll bar link of claim 12, wherein the secondary latch body has a pawl portion configured to receive the link rod therein in the locked state.

18. The anti-roll bar link of claim 12, wherein the latch assembly includes a locking aperture configured to receive a locking pin to prevent inadvertently transitioning the latch assembly from the locked state to the unlocked state.

19. The anti-roll bar link of claim 12, wherein the body further comprises a mounting bushing positioned in a primary bore of the body and surrounding at least a portion of a mounting rod operably coupling the anti-roll bar to the body through the mounting bushing, wherein the mounting bushing is configured to permit articulation of the mounting rod with respect to the body.

20. The anti-roll bar link of claim 12, wherein the mounting nut comprises an inner mounting nut, wherein the anti-roll bar link further comprises an outer mounting nut positioned adjacent to and axially outward from the inner mounting nut, and wherein the inner mounting nut and the outer mounting nut are configured to couple the anti-roll bar link to the vehicle suspension.

21. The anti-roll bar link of claim 20, further comprising a ball socket operably coupled to the link rod, and a sleeve at least partially surrounding the ball socket, wherein articulation of the inner and outer mounting nuts with respect to the link rod causes the sleeve to rotate relative to the ball socket.

22. The anti-roll bar link of claim 21, wherein the sleeve comprises a low-friction material.

23. The anti-roll bar link of claim 20, further comprising an articulating grease seal extending away from the link rod to the inner mounting nut.

* * * * *